US008334875B2

(12) United States Patent
Matsusaka et al.

(10) Patent No.: US 8,334,875 B2
(45) Date of Patent: Dec. 18, 2012

(54) OPERATION DISPLAYING DEVICE AND IMAGE FORMING DEVICE

(75) Inventors: Tetsuya Matsusaka, Osaka (JP); Toshimasa Takaoka, Osaka (JP)

(73) Assignee: Kyocera Document Solutions Inc. (JP)

( * ) Notice: Subject to any disclaimer, the term of this patent is extended or adjusted under 35 U.S.C. 154(b) by 800 days.

(21) Appl. No.: 12/470,581

(22) Filed: May 22, 2009

(65) Prior Publication Data

US 2009/0295814 A1 Dec. 3, 2009

(30) Foreign Application Priority Data

May 29, 2008 (JP) ................................ 2008-140699

(51) Int. Cl.
*G06F 12/02* (2006.01)
*G06F 13/00* (2006.01)

(52) U.S. Cl. ....................................... 345/543; 711/170

(58) Field of Classification Search .................. 345/543; 711/170

See application file for complete search history.

(56) References Cited

U.S. PATENT DOCUMENTS

| | | | | |
|---|---|---|---|---|
| 6,865,592 | B1 * | 3/2005 | Shindo | 709/203 |
| 7,398,369 | B2 * | 7/2008 | Dickenson | 711/170 |
| 7,779,223 | B2 * | 8/2010 | Dickenson | 711/170 |
| 7,793,161 | B2 * | 9/2010 | Chen et al. | 714/47.2 |
| 7,873,957 | B2 * | 1/2011 | Nallipogu et al. | 717/168 |
| 7,895,483 | B2 * | 2/2011 | Hogstrom et al. | 714/718 |
| 7,996,665 | B2 * | 8/2011 | Kimura et al. | 713/2 |
| 8,195,720 | B2 * | 6/2012 | Hwang | 707/813 |
| 2005/0076184 | A1 * | 4/2005 | Schumacher | 711/170 |
| 2005/0235127 | A1 * | 10/2005 | Muthiah et al. | 711/170 |
| 2006/0212852 | A1 * | 9/2006 | Hwang | 717/127 |
| 2008/0100636 | A1 * | 5/2008 | Lai et al. | 345/546 |
| 2008/0282255 | A1 * | 11/2008 | Kawamoto et al. | 719/312 |
| 2008/0294853 | A1 * | 11/2008 | Kowlali et al. | 711/154 |
| 2008/0294936 | A1 * | 11/2008 | Hogstrom et al. | 714/8 |
| 2008/0320449 | A1 * | 12/2008 | Hwang | 717/127 |

FOREIGN PATENT DOCUMENTS

| | | |
|---|---|---|
| JP | 2001-056772 | 2/2001 |
| JP | 2001-306345 | 11/2001 |
| JP | 2002-373085 | 12/2002 |
| JP | 2003-309691 | 10/2003 |
| JP | 2005-342968 | 12/2005 |
| JP | 2007-264805 | 10/2007 |

* cited by examiner

*Primary Examiner* — Daniel Washburn
(74) *Attorney, Agent, or Firm* — Ostrolenk Faber LLP

(57) ABSTRACT

An operation displaying device including: an operation screen which receives an instruction for operation; a computing device which executes computation; and a performance monitoring unit which monitors a performance of an application software that executes display processing, wherein: when an operation mode of the operation displaying device is in a power saving mode and a remaining memory capacity of a memory, which is used as temporary storage by the computing device, is less than or equal to than a predetermined threshold, the performance monitoring unit restarts the application software which is running.

8 Claims, 2 Drawing Sheets

OPERATION DISPLAYING DEVICE AND IMAGE FORMING DEVICE

The present application claims priority on Japanese Patent Application No. 2008-140699, filed May 29, 2008, the content of which is incorporated herein by reference.

BACKGROUND OF THE INVENTION

1. Field of the Invention

The present invention relates to an operation displaying device and an image forming device which has both an operation function and a displaying function.

2. Description of the Related Art

A "memory leak" is known to be a problem concerning computer systems that have a computing device such as a CPU (Central Processing Unit) and the like. A memory leak is a phenomenon such that a memory capacity of a memory for temporary storage decreases gradually as said computer system continues to run. When a memory leak occurs, the processing speed of the computer system decreases. In addition, as a result of a memory leak, the computer system may eventually stop running.

According to a technology for dealing with such memory leaks, the usage of a memory is monitored regularly, and when the usage of the memory exceeds a prescribed value at which the usage of the memory affects a CPU's response, an operation that is most frequently processed among the various operations will be restarted.

Further, another technology informs a user that an OS (Operating System) will be restarted, and when the user instructs that the restarting be performed, the technology restarts the OS.

Incidentally, the related technology described above has a problem in that, when a user is using an information processing device or a POS terminal while the operation that is most frequently processed is restarted, the user's operation is obstructed.

In addition, the user cannot perform any operations while the OS is restarted.

Considering the problems described above, an object of the present invention is to resolve or mitigate memory leaks without obstructing a user's operations.

SUMMARY OF THE INVENTION

In order to achieve the above object, the present invention employs the following. Namely, an operation displaying device according to an aspect of the present invention includes: an operation screen which receives an instruction for operation; a computing device which executes computation; and a performance monitoring unit which monitors a performance of an application software that executes display processing, wherein: when an operation mode of the operation displaying device is in a power saving mode and a remaining memory capacity of a memory, which is used as temporary storage by the computing device, is less than or equal to a predetermined threshold, the performance monitoring unit restarts the application software which is running.

In addition, an image forming device according to an aspect of the present invention which forms an image includes the above-described operation displaying device.

Based on the operation displaying device and the image forming device according to an aspect of the present invention, it is possible to resolve or mitigate a memory leak without obstructing a user's operation, because application software that is running will be restarted when an operation mode is in power saving mode and when a remaining memory capacity of a memory used by a computing device for temporary storage is less than or equal to a predetermined threshold.

The above object as well as other objects of the present invention and the present invention's characteristics and advantages will become clearer from the appended figures and the detailed description below.

DETAILED DESCRIPTION OF THE PREFERRED EMBODIMENTS

Figure 1:
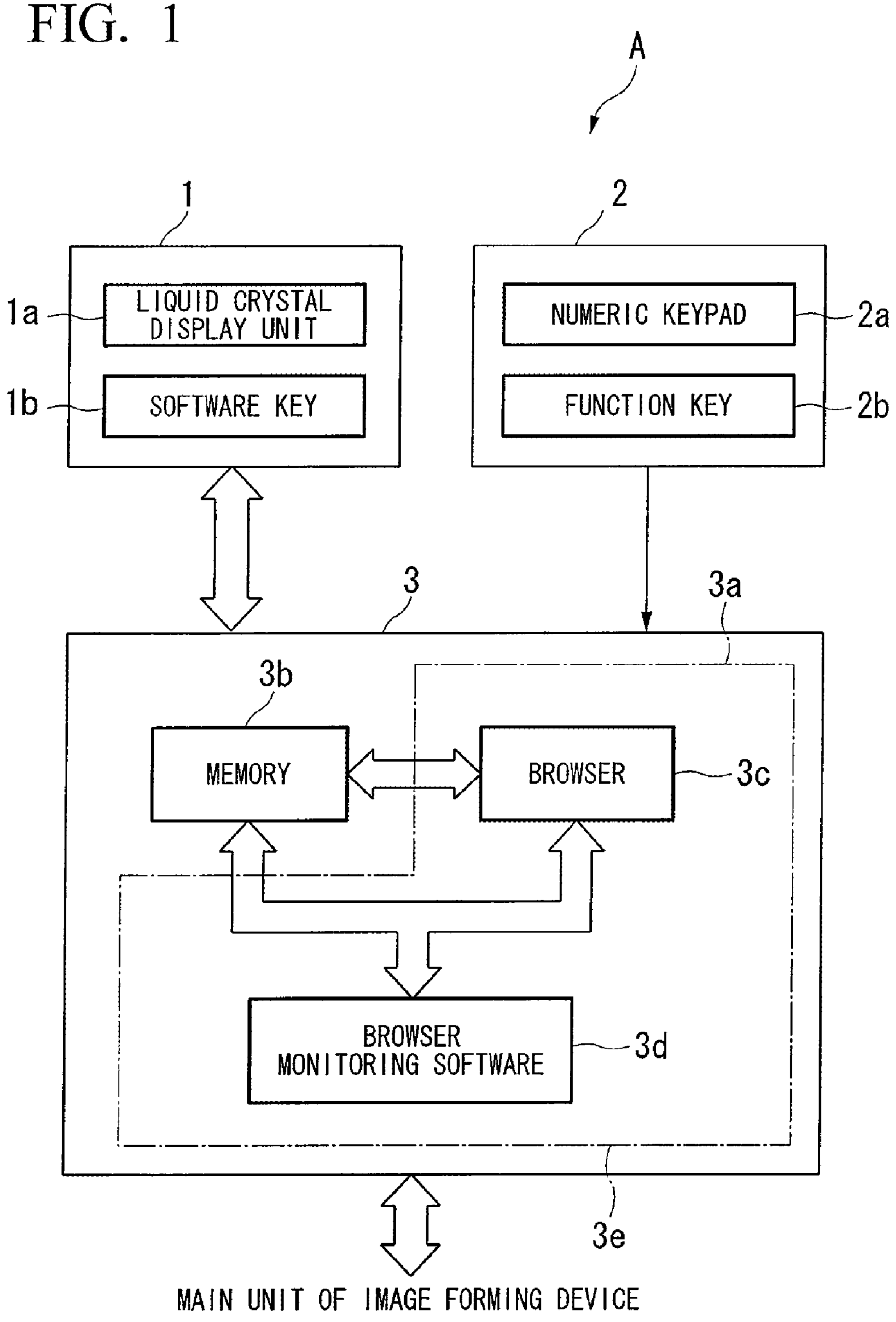
FIG. 1 is a block diagram showing a configuration of an operation displaying device A according to an embodiment of the present invention.

Hereunder, an embodiment of the present invention is described with reference to FIGS. 1 and 2. FIG. 1 is a block diagram showing a configuration of an operation displaying device A according to the present embodiment. As shown in this figure, the operation displaying device A includes a touch panel 1, a hardware key 2, and a control unit 3. In addition, the touch panel 1 includes a liquid crystal display unit 1*a*, a software key 1*b*, and the like. Further, the hardware key 2 includes a numeric keypad 2*a*, a function key 2*b*, and the like.

The control unit 3 includes a computing control unit 3*a*, a memory 3*b*, a browser 3*c* (software), a browser monitoring software 3*d* (software), an operation panel software 3*e*, and the like.

The operation displaying device A is one of the components of an image forming device of a copying machine, a facsimile, a printer, a hybrid machine combining the functions of these machines, and the like. This operation displaying device A is connected to a main body of the image forming device. The main body of the image forming device is one of the components that perform an upper control.

The touch panel 1 displays an operation screen, such as a software key 1*b*, and the like, to the liquid crystal display unit 1*a*. The touch panel 1 outputs as an operation detection signal, a position on the operation screen where the user pressed. Further, the touch panel 1 displays the software key 1*b* on the operation screen based on an image signal inputted from the control unit 3. The touch panel 1 then outputs the operation detection signal to the control unit 3.

The hardware key 2 includes the numeric keypad 2*a* the function key 2*b*, and the like, which are placed as physical units. The hardware key 2 outputs the user's operation (pressing by the user) as an operation detection signal to the control unit 3. The control unit 3 controls a display of the software key 1*b* of the liquid crystal display unit 1*a* of the touch panel 1 based on an upper control command and the operation detection signal inputted from the computing control unit 3*a*, the memory 3*b*, the browser 3*c*, the browser monitoring software 3*d*, and the main body of the image forming device. The control unit 3 distinguishes the user's instructions for operation which are shown by the operation detection signals inputted respectively from the touch panel 1 and the hardware key 2. Further, the control unit 3 outputs to the main body of the image forming device, the operation signal that shows the user's instructions for operation which were distinguished as described above.

Concerning the control unit 3, the computing control unit 3*a* includes computing devices such as a CPU (Central Processing Unit) or an MPU (Micro Processing Unit), and the like, a ROM (Read Only Memory), and interface circuit, and the like. This computing control unit 3*a* is connected to the touch panel 1 and hardware key 2 via the interface circuit. Further, the computing control unit 3*a* controls the touch panel 1 by executing at the computing device, the operation panel software 3*e* which includes multiple application software programs such as the browser 3*c* stored in the ROM, the browser monitoring software 3*d*, and the like.

The operation panel software 3*e*, which is executed by the computing device within the computing control unit 3*a*, is a software system including multiple software programs such as the browser 3*c*, the browser monitoring software 3*d*, and the like. The computing control unit 3*a* controls the overall operation of the operation display device A by launching, when necessary, each application software program included in the operation panel software 3*e* according to, for example, the user's instructions for operation.

The browser 3*c*, which is included in the operation panel software 3*e*, is a software program that processes a display concerning the liquid crystal display unit 1*a* of the touch panel 1*a*. This browser 3*c* displays the operation screen on the liquid crystal display unit 1*a* based on, for example, the operation detection signal inputted from the touch panel 1 and the upper control command inputted from the main body of the image forming device.

The browser monitoring software 3*d* is a performance monitoring unit concerning the operation display device A. This browser monitoring software 3*d* monitors a performance of the browser 3*c*. When a set of predetermined conditions (conditions for restarting) is satisfied, the browser monitoring software 3*d* forcibly restarts the browser 3*c*, and makes the browser 3*c* display on the liquid crystal display unit 1*a* that the restarting was executed. The three conditions for restarting are as follows:

(I) The operation mode is in sleep mode (power saving mode).

(II) The remaining memory capacity of the memory 3*b* is less than or equal to a predetermined threshold.

(III) The operation mode is not in a state of transitioning to the first sleep mode.

The memory 3*b* is an RAM (Random Access Memory) that functions as a working area of the computing control unit 3*a*. This memory 3*b* temporarily stores various computing results obtained while the computing control unit 3*a* executes the operation panel software 3*e*. For example, the computing results obtained by the computing control unit 3*a* executing the browser 3*c* and performing various computations are successively written into the memory 3*b* based on a write command concerning the browser 3*c*. These computing results are successively deleted based on a deletion command concerning the browser 3*c*.

Figure 2:
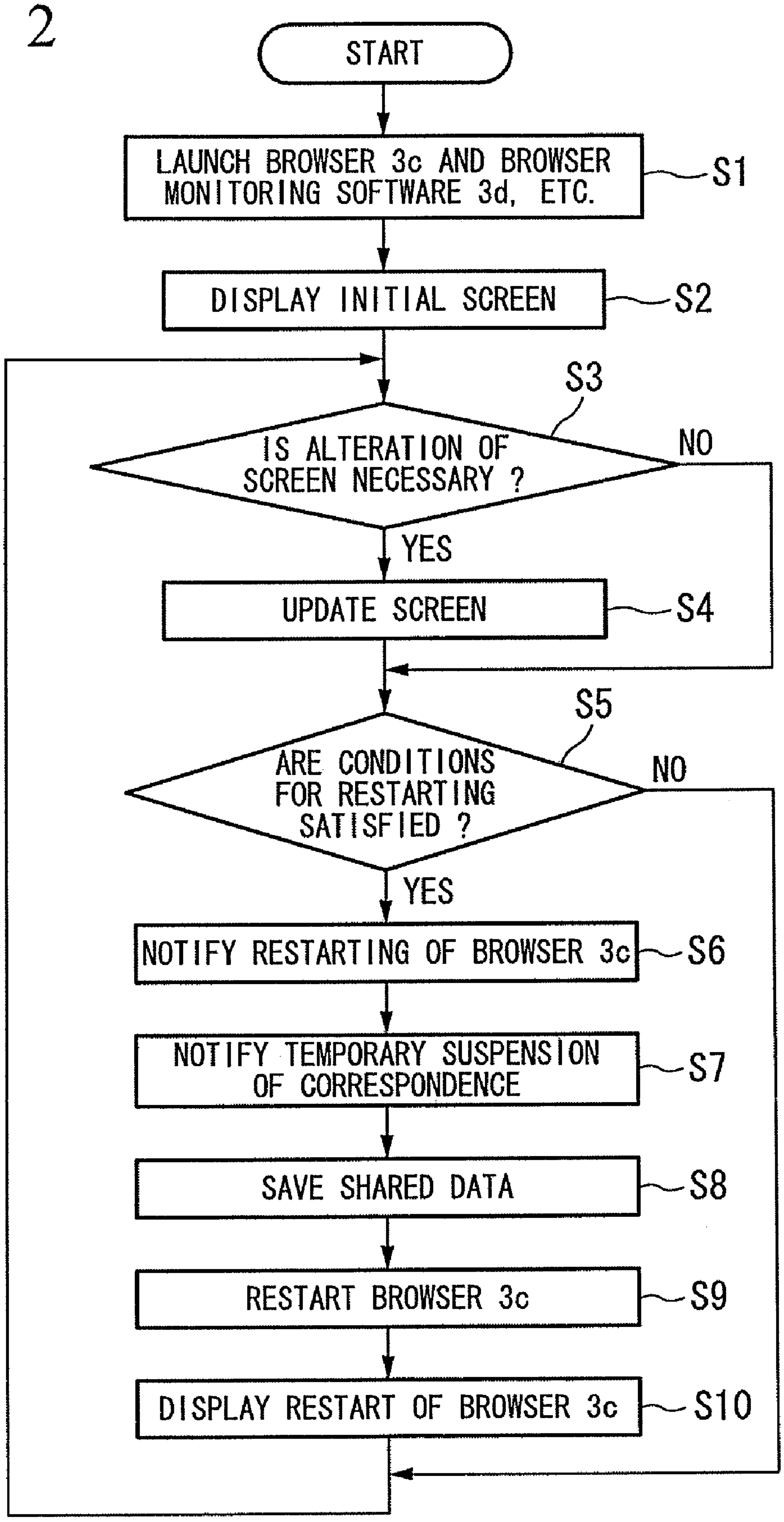
FIG. 2 is a flowchart showing a performance of an operation displaying device A according to an embodiment of the present invention.

Next, a performance of the present operation display device A configured as above is described in detail according to the flowchart shown in FIG. 2.

When an electric power source of the main body of the image forming device is turned on, electric power is supplied to the present operation display device A as well. Then, the computing control unit 3*a* launches multiple software programs including the browser 3*c* and the browser monitoring software 3*d* (step S1). Next, the computing control unit 3*a* displays an initial screen (operation screen) on the liquid crystal display unit 1*a* of the touch panel 1 based on the browser 3*c* (step S2). Then, when the computing control unit 3*a* receives, from the touch panel 1 or the hardware key 2 or the main body of the image forming device, an input of an operation detection signal prompting an update of the operation screen on the liquid crystal display device 1*a* or an upper control command (step S3), the computing control unit 3*a* updates the operation screen displayed on the liquid crystal display unit 1*a* based on the browser 3*c* and according to the operation detection signal or the upper control command (step S4).

Here, the computing control unit 3*a* performs arithmetic processing concerning, for example, the creation of the operation screen concerning the updating or displaying of the operation screen on the liquid crystal display unit 1*a* based on the browser 3*c*. Further, during this computing process, the computing control unit 3*a* frequently performs the procedure of temporarily storing various computing results into the memory area which was allocated in the memory 3*b* on a case-by-case basis. In addition, the computing control unit 3*a* also frequently performs the procedure of deleting the computing results stored in this memory area. However, as a result of the computing control unit 3*a* frequently writing the computing results into the memory 3*b* and frequently deleting the computing results from the memory 3*b*, a phenomenon generally known as a "memory leak" occurs in which the overall memory capacity of the memory 3*b* decreases gradually.

The computing control unit 3*a* monitors the condition of a memory leak occurring at the memory 3*b* based on the browser monitoring software 3*d*. When the conditions for restarting are satisfied (step S5) the computing control unit 3*a* notifies software that is running, which is software other than the browser 3*c*, that the browser 3*c* will be restarted (step S6). Then, the computing control unit 3*a* notifies the main body of the image forming device and other application software which is running that correspondence will be temporarily suspended (step S7). Then, at the memory 3*b*, the computing control unit 3*a* saves data (shared data) that are stored in the memory area shared with software that is running, excluding the browser 3*c*, by copying such data to another memory area (step S8). Further, the computing control unit 3*a* restarts the browser 3*c*, which is a leading cause of memory leaks, based on the browser monitoring software 3*d* (step S9). In addition, the computing control unit 3*a* shows on the liquid crystal display unit 1*a* of the touch panel 1 that this browser 3*c* has been restarted (step S10).

As a result of the browser 3*c* being restarted in this way, the browser 3*c* shuts down momentarily. Consequently, the entire the memory area that was allocated in the memory 3*b* in relation to the browser 3*c* will be opened. Therefore, the memory leak, which is caused in part by the browser 3*c*, is completely resolved. Not only application software such as the operation panel software 3*e* but also the OS (operating system) can be a cause of the memory leak. Thus, in some cases, a memory leak may not be completely resolved when an application software program, which is, for example, a component of the operation panel software 3*e* of the browser 3*c*, is restarted. In addition, software other than the browser 3*c* may sometimes trigger a memory leak.

However, considering that a leading cause of memory leaks is the browser 3*c* that controls the display of the touch panel 1, the present operation display device A restarts the browser 3*c* when the operation mode is in sleep mode and the remaining memory capacity of the memory 3*b* is less than or equal to a predetermined threshold. Therefore, it is possible to resolve or mitigate memory leaks without obstructing the user's operation.

Further, the present operation display device A restarts the browser 3*c* when, along with conditions (I) and (II), the condition (III) (the operation mode is not in a state of transitioning to the first slip mode, in other words, the operation mode is in a sleep mode for the second time or more) is satisfied. As a result, it is possible to reduce the amount of restarting that obstructs the user's operation while resolving or mitigating the memory leak.

Incidentally, in the present embodiment, the conditions for restarting were conditions (I) to (III). The conditions for restarting may also be conditions (I) and (II).

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. Accordingly, the invention is not to be considered as being limited by the foregoing description, and is only limited by the scope of the appended claims.

A summary of the present invention according to each of the above embodiments is as follows: Namely, an operation displaying device according to an aspect of the present invention includes: an operation screen which receives an instruction for operation; a computing device which executes computation; and a performance monitoring unit which monitors a performance of an application software that executes display processing, wherein: when an operation mode of the operation displaying device is in a power saving mode and a remaining memory capacity of a memory, which is used as temporary storage by the computing device, is less than or equal to a predetermined threshold, the performance monitoring unit restarts the application software which is running. When the performance mode is in a power saving mode for the second time or more after the operation displaying device has been launched, the performance monitoring unit may restart the application software which is running. When a plurality of the application software is running, the performance monitoring unit may select the application software among these plurality of application software which is a cause for a decrease in the remaining memory capacity of the memory used as temporary storage by the computing device, and restarts the application software selected. When the performance monitoring unit restarts the application software, which is running, the performance monitoring unit may display on the operation screen that a restarting was executed. In addition, an image forming device according to an aspect of the present invention which forms an image includes the above-described operation displaying device.

What is claimed is:

1. An operation displaying device having a power saving mode of operation and a non-power saving mode of operation, the operation display device comprising:

an operation screen configured to receive an instruction for operation and to display information to a user;

a computing device configured to execute computation for running an application software that executes display processing and for generating the instruction; and a performance monitoring unit configured to monitor performance of the application software that executes the display processing, wherein when the operation displaying device is in the power saving mode and a remaining memory capacity of a memory, which is used as temporary storage by the computing device, is less than or equal to a predetermined threshold, the computing device saves shared data in the memory by copying the shared data to a second memory area, the shared data stored in a first memory area shared with running application software excluding a browser, and the performance monitoring unit is configured to restart only the browser.

2. The operation displaying device according to claim 1, wherein the performance monitoring unit is configured to restart the browser only when the performance mode is in the power saving mode for a second time or for more than the second time after the operation displaying device has been launched.

3. The operation displaying device according to claim 1, wherein when the application software is running and one or more additional application software is also running, the performance monitoring unit is configured to select an application software among the application software and the one or more additional application software which is a cause for a decrease in the remaining memory capacity of the memory used as temporary storage by the computing device, and to restart the application software selected.

4. The operation displaying device according to claim 1, wherein when the performance monitoring unit restarts the browser, the performance monitoring unit displays on the operation screen that a restarting was executed.

5. An image forming device that forms an image, the image forming device comprising the operation displaying device according to claim 1.

6. The image forming device according to claim 5, wherein the image forming device is a copy machine.

7. The image forming device according to claim 5, wherein the image forming device is a facsimile machine.

8. The image forming device according to claim 5, wherein the image forming device is a printer.

* * * * *